United States Patent
Tokioka

(10) Patent No.: US 8,419,555 B2
(45) Date of Patent: Apr. 16, 2013

(54) SPLINE TELESCOPIC SHAFT, METHOD FOR MANUFACTURING SPLINE TELESCOPIC SHAFT, AND VEHICLE STEERING APPARATUS

(75) Inventor: Ryoichi Tokioka, Kashiba (JP)

(73) Assignees: JTEKT Corporation, Osaka (JP); Koyo Machine Industries Co., Ltd., Osaka (JP)

( * ) Notice: Subject to any disclaimer, the term of this patent is extended or adjusted under 35 U.S.C. 154(b) by 75 days.

(21) Appl. No.: 12/805,425

(22) Filed: Jul. 30, 2010

(65) Prior Publication Data

US 2011/0034256 A1 Feb. 10, 2011

(30) Foreign Application Priority Data

Aug. 7, 2009 (JP) ................................ 2009-184542

(51) Int. Cl.
*F16C 3/03* (2006.01)
*C23C 26/00* (2006.01)
*B05D 5/08* (2006.01)

(52) U.S. Cl.
USPC ................. 464/162; 29/434; 29/458; 427/11; 427/213

(58) Field of Classification Search .................. 464/162, 464/18, 8; 29/458, 459, 525, 434; 403/359.1, 403/359.2, 359.3, 359.4, 359.5, 359.6; 427/11, 427/213
See application file for complete search history.

(56) References Cited

U.S. PATENT DOCUMENTS

| | | | | |
|---|---|---|---|---|
| 3,367,142 A | * | 2/1968 | Groves et al. | 464/162 |
| 4,552,544 A | * | 11/1985 | Beckman et al. | 464/162 |
| 5,720,102 A | * | 2/1998 | McClanahan | 29/458 X |
| 5,903,965 A | | 5/1999 | Fletcher et al. | |
| 2001/0039214 A1 | * | 11/2001 | Yaegashi et al. | 464/162 |
| 2006/0213244 A1 | | 9/2006 | Brissette | |

FOREIGN PATENT DOCUMENTS

| | | |
|---|---|---|
| EP | 1 704 938 A1 | 9/2006 |
| JP | 2001-130420 | 5/2001 |
| JP | 2005-153677 A | 6/2005 |
| JP | 2009-168194 | 7/2009 |

* cited by examiner

*Primary Examiner* — Gregory Binda
*Assistant Examiner* — Matthieu Setliff
(74) *Attorney, Agent, or Firm* — Rabin & Berdo, P.C.

(57) ABSTRACT

A spline telescopic shaft includes an inner shaft having an outer tooth surface, and a cylindrical outer shaft having an inner tooth surface and arranged to fit to the inner shaft slidably in an axial direction of the inner shaft. Either one of the outer tooth surface and the inner tooth surface includes a first resin coating. The other of the outer tooth surface and the inner tooth surface includes a second resin coating. The second resin coating is formed by processing for sliding an intermediate member for manufacturing the inner shaft and an intermediate member for manufacturing the outer shaft in the axial direction, to transfer a part of a resin material provided in the intermediate member for manufacturing the shaft including the one tooth surface for forming the first resin coating to the intermediate member for manufacturing the shaft including the other tooth surface.

14 Claims, 8 Drawing Sheets

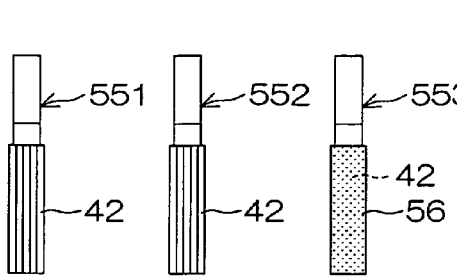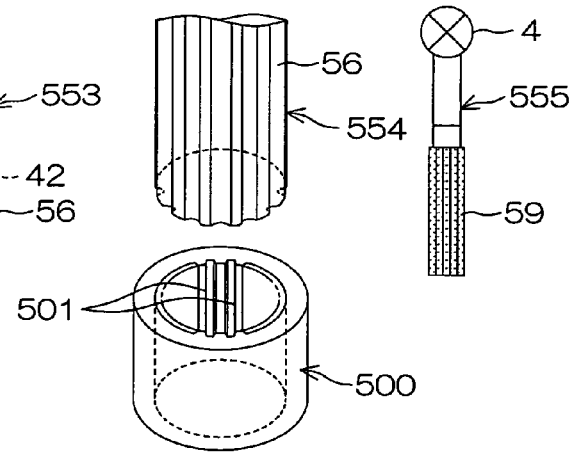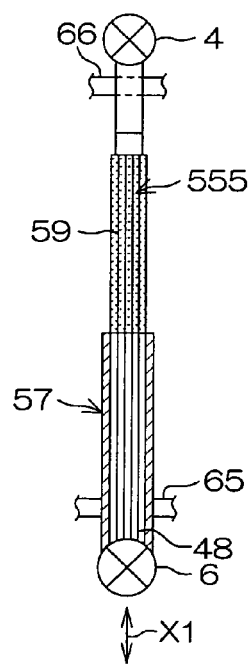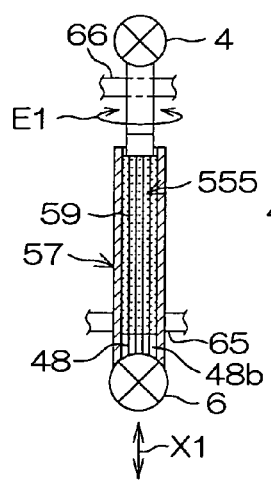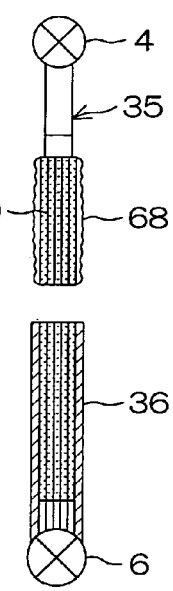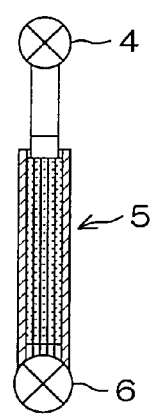

SPLINE TELESCOPIC SHAFT, METHOD FOR MANUFACTURING SPLINE TELESCOPIC SHAFT, AND VEHICLE STEERING APPARATUS

BACKGROUND OF THE INVENTION

1. Field of the Invention

The present invention relates to a spline telescopic shaft, a method for manufacturing the spline telescopic shaft, and a vehicle steering apparatus.

2. Description of Related Art

Japanese Unexamined Patent Publication No. 2005-153677 discusses a telescopic shaft for vehicle steering. The telescopic shaft for vehicle steering has a surface hardened layer provided on its tooth surface via shot peening, and a large number of minute recesses are formed on the surface hardened layer. The recesses function as a grease reservoir.

In this type of spline telescopic shaft, resin coatings may be respectively formed on tooth surfaces of an inner shaft and an outer shaft. Frictional resistance in engagement between teeth of the inner shaft and teeth of the outer shaft is reduced by forming the resin coatings. Thus, friction between both the teeth is suppressed. Backlash between both the shafts in the early stages of use of the telescopic shaft is reduced. A sliding load between both the shafts can be reduced. Therefore, work for assembling the telescopic shaft into a vehicle is simplified. Moreover, durability is improved. Further, stick slip vibration between both the shafts is suppressed through reduction of a change in the sliding load between both the shafts. This improves quietness.

SUMMARY OF THE INVENTION

Even if a contact surface between teeth of an inner shaft and teeth of an outer shaft seems to be sufficiently ensured by coating respective tooth surfaces of both the shafts with resin in a stage for manufacturing a telescopic shaft, respective surface roughnesses of both the teeth may be great microscopically. In this case, even if no backlash is produced between both the shafts in the early stages of use of the telescopic shaft, backlash in a rotational direction between both the shafts is rapidly increased when a period of time for the use has elapsed. It is because the resin coating rapidly wears by sliding between both the shafts in the early stages of the use of the telescopic shaft. When the telescopic shaft is used over a long period of time, the total number of times of sliding between both the shafts is increased. As a result, more parts of the resin coating wear. Particularly, the surface roughnesses of the tooth surfaces along the axial direction of both the shafts are increased.

The present invention is directed to providing a spline telescopic shaft including an inner shaft having an outer tooth surface formed on its outer periphery, and a cylindrical outer shaft having an inner tooth surface arranged to engage with the outer tooth surface and arranged to fit to the inner shaft slidably in an axial direction of the inner shaft. Either one of the outer tooth surface and the inner tooth surface includes a first resin coating. The other of the outer tooth surface and the inner tooth surface includes a second resin coating. The second resin coating is provided by processing for sliding an intermediate member for manufacturing the inner shaft and an intermediate member for manufacturing the outer shaft in the axial direction, to transfer a part of a resin material provided in the intermediate member for manufacturing the shaft including the one tooth surface for forming the first resin coating to the intermediate member for manufacturing the shaft including the other tooth surface.

According to the present invention, contact between the inner shaft and the outer shaft can be contact between resins having low frictional resistances. A part of a resin material provided to form the first resin coating is transferred by sliding between the inner shaft manufacturing intermediate member and the outer shaft manufacturing intermediate member. Thus, the second resin coating is formed when the spline telescopic shaft is manufactured. As a result of thus forming the second resin coating, backlash (a space) between the first and second resin coatings can be significantly reduced in a circumferential direction of the inner and outer shafts while significantly reducing respective surface roughnesses of the first resin coating and the second resin coating. Thus, each of the resin coatings can be inhibited from rapidly wearing in the early stages of use of the spline telescopic shaft. Further, the wear of the first and second resin coatings can be suppressed over a long period of time. As a result of thus suppressing the backlash between the first and second resin coatings, a rattle sound (a collision sound between both the tooth surfaces generated in a space in a circumferential direction between the inner and outer shafts) can be suppressed. This can more greatly improve quietness. As a result of suppressing the backlash between the first and second resin coatings, a steering feeling can be improved when the spline telescopic shaft is applied to a vehicle steering apparatus.

BRIEF DESCRIPTION OF THE DRAWINGS

FIG. 4A is a schematic view illustrating a forging process out of processes for manufacturing an intermediate shaft.

FIG. 4B is a schematic view illustrating a preprocessing process out of processes for manufacturing an intermediate shaft.

FIG. 4C is a schematic view illustrating a coating process out of processes for manufacturing an intermediate shaft.

FIG. 4D is a schematic view illustrating a spline forming process out of processes for manufacturing an intermediate shaft.

FIG. 4E is a schematic view illustrating a joint connecting process out of processes for manufacturing an intermediate shaft.

FIG. 4F is a schematic view illustrating a press fitting process out of processes for manufacturing an intermediate shaft.

FIG. 4G is a schematic view illustrating a sliding process out of processes for manufacturing an intermediate shaft.

FIG. 4H is a schematic view illustrating a grease coating process out of processes for manufacturing an intermediate shaft.

FIG. 4I is a schematic view illustrating a state where an intermediate shaft is completed out of processes for manufacturing an intermediate shaft.

DETAILED DESCRIPTION OF THE PREFERRED EMBODIMENTS

A preferred embodiment of the present invention will be described with reference to the accompanying drawings.

Figure 1:
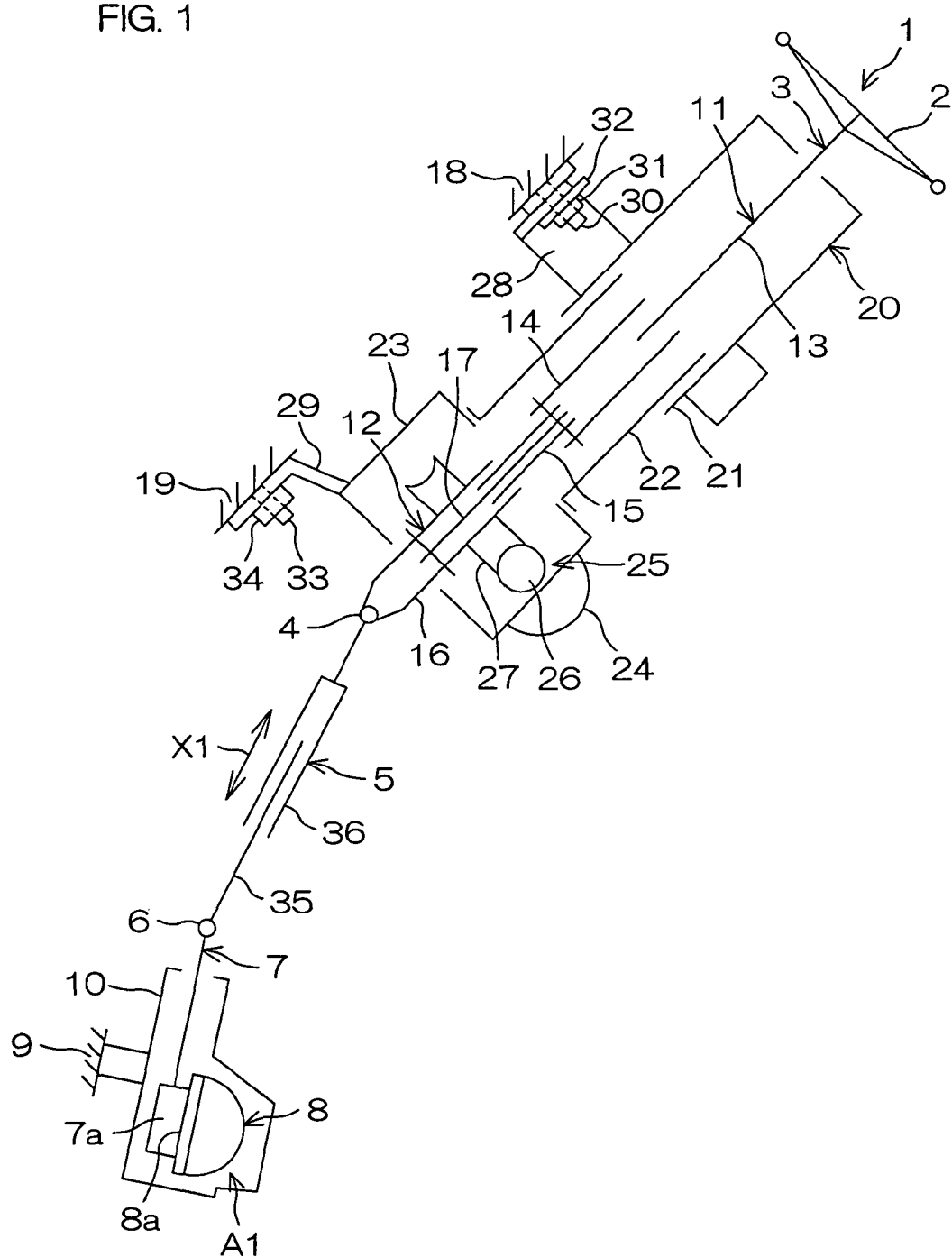
FIG. 1 illustrates a schematic configuration of a vehicle steering apparatus having an intermediate shaft to which a spline telescopic shaft according to an embodiment of the present invention is applied.

FIG. 1 illustrates a schematic configuration of a vehicle steering apparatus having an intermediate shaft to which a spline telescopic shaft according to an embodiment of the present invention is applied. Referring to FIG. 1, the vehicle steering apparatus 1 includes a steering shaft 3 connected to a steering member 2 such as a steering wheel, and an intermediate shaft 5 serving as a spline telescopic shaft connected to the steering shaft 3 via a universal joint 4.

The vehicle steering apparatus 1 includes a pinion shaft 7 that is connected to the intermediate shaft 5 via a universal joint 6 and a rack shaft 8. The rack shaft 8 has a rack 8a that engages with a pinion 7a provided in the vicinity of an end of the pinion shaft 7. The intermediate shaft 5 forms a telescopic shaft for vehicle steering.

A rack-and-pinion mechanism including the pinion shaft 7 and the rack shaft 8 constitutes a steering mechanism A1. The rack shaft 8 is supported movably in an axial direction along a right-and-left direction of a vehicle (a direction perpendicular to paper) by a housing 10 fixed to a vehicle body-side member 9. Each of ends of the rack shaft 8 is connected to a corresponding wheel via a corresponding tie rod and a corresponding knuckle arm, which is not illustrated. A steering torque generated by the steering member 2 is transmitted to the steering mechanism A1 via the steering shaft 3 and the intermediate shaft 5.

The steering shaft 3 includes a first steering shaft 11 and a second steering shaft 12 that are coaxially connected to each other. The first steering shaft 11 includes an upper shaft 13 and a lower shaft 14 that are spline-coupled to each other. The upper shaft 13 and the lower shaft 14 are fitted to each other together rotatably and relatively slidably in an axial direction. Either one of the upper shaft 13 and the lower shaft 14 constitutes an inner shaft, and the other shaft constitutes a cylindrical outer shaft. In the present embodiment, the upper shaft 13 and the lower shaft 14 respectively constitute an inner shaft and an outer shaft.

The second steering shaft 12 includes an input shaft 15, an output shaft 16, and a torsion bar 17. The input shaft 15 is connected to the lower shaft 14 together rotatably. The output shaft 16 is connected to the intermediate shaft 5 via the universal joint 4. The torsion bar 17 connects the input shaft 15 and the output shaft 16 to each other relatively rotatably.

The steering shaft 3 is rotatably supported via a bearing (not illustrated) by a steering column 20 fixed to vehicle body-side members 18 and 19.

The steering column 20 includes a cylindrical upper jacket 21 and a cylindrical lower jacket 22 that are fitted to each other relatively movably in the axial direction, and a housing 23. The housing 23 is connected to a lower end in the axial direction of the lower jacket 22. The housing 23 houses a speed reduction mechanism 25. The speed reduction mechanism 25 decelerates rotation of an electric motor 24 for steering assist and transmits the power to the output shaft 16. Thus, the electric motor 24 applies a steering assist force to the steering mechanism A1.

The speed reduction mechanism 25 includes a driving gear 26 and a driven gear 27. The driving gear 26 is connected to a rotating shaft (not illustrated) of the electric motor 24 together rotatably. The driven gear 27 engages with the driving gear 26, and rotates together with the output shaft 16. The driving gear 26 is composed of a worm shaft, for example, and the driven gear 27 is composed of a worm wheel, for example.

An output of the electric motor 24 is transmitted to the output shaft 16 via the speed reduction mechanism 25, and is further transmitted to the steering mechanism A1 via the intermediate shaft 5 or the like. Thus, the intermediate shaft 5 constitutes a part of a power transmission path for transmitting an output of the electric motor 24 to the steering mechanism A1.

The steering column 20 is fixed to the vehicle body-side members 18 and 19 via an upper bracket 28 on the back side of the vehicle and a lower bracket 29 on the front side of the vehicle. The upper bracket 28 can be fixed to the upper jacket 21 in the steering column 20 via a column bracket (not illustrated). The upper bracket 28 is fixed to the vehicle body-side member 18 using a fixed bolt (stud bolt) 30, a nut 31, and a capsule 32. The fixed bolt 30 projects downward from the vehicle body-side member 18. The nut 31 is screwed into the fixed bolt 30. The capsule 32 is detachably held in the upper bracket 28.

The lower bracket 29 is fixed to the housing 23 in the steering column 20. The lower bracket 29 is fixed to the vehicle body-side member 19 using a fixed bolt (stud bolt) 33 projecting from the vehicle body-side member 19 and a nut 34 screwed into the fixed bolt 33.

Figure 2:
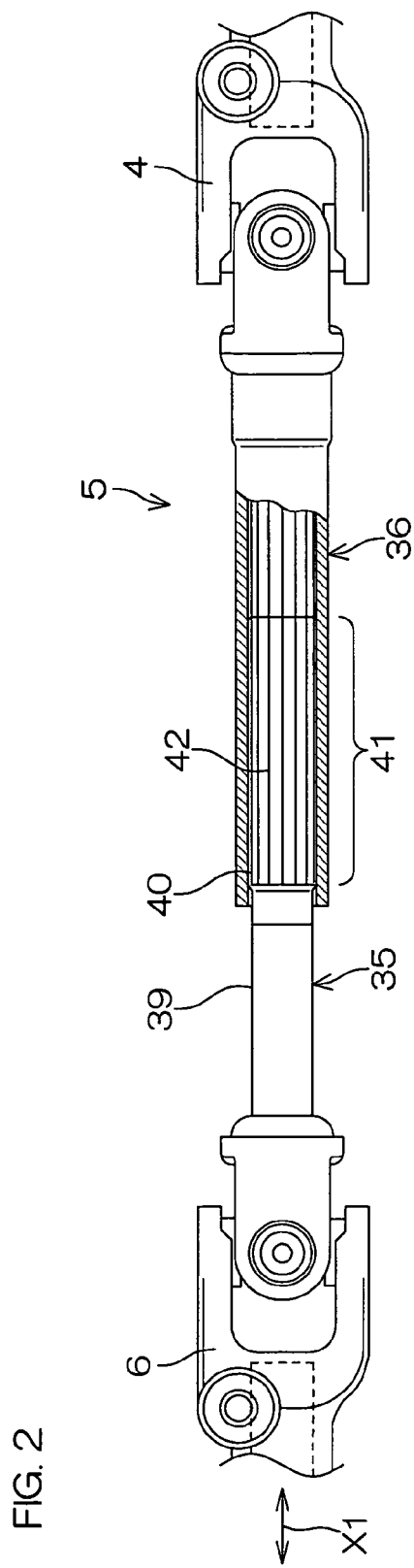
FIG. 2 is a partially broken side view of an intermediate shaft.

Referring to FIGS. 1 and 2, the intermediate shaft 5 serving as the spline telescopic shaft is formed by spline-fitting an inner shaft 35 and a cylindrical outer shaft 36 to each other slidably in the axial direction X1 of the inner shaft 35 (an axial direction of the intermediate shaft 5) and torque-transmittably.

Either one of the inner shaft 35 and the outer shaft 36 constitutes an upper shaft, and the other shaft constitutes a lower shaft. In the present embodiment, the outer shaft 36 is connected to the universal joint 4 as the upper shaft, and the inner shaft 35 is connected to the universal joint 6 as the lower shaft. A lubricant such as grease is interposed between the inner shaft 35 and the outer shaft 36. This causes sliding resistance to be reduced when the inner shaft 35 and the outer shaft 36 relatively move in the axial direction X1.

In the present embodiment, the spline telescopic shaft is applied to the intermediate shaft 5. However, the spline telescopic shaft according to the present invention may be applied to the first steering shaft 11 so that the first steering shaft 11 performs a telescopic adjustment function and a shock absorption function. In the present embodiment, the vehicle steering apparatus 1 is an electric power steering apparatus. The spline telescopic shaft according to the present invention may be applied to a steering apparatus for manual steering vehicle.

Figure 3:
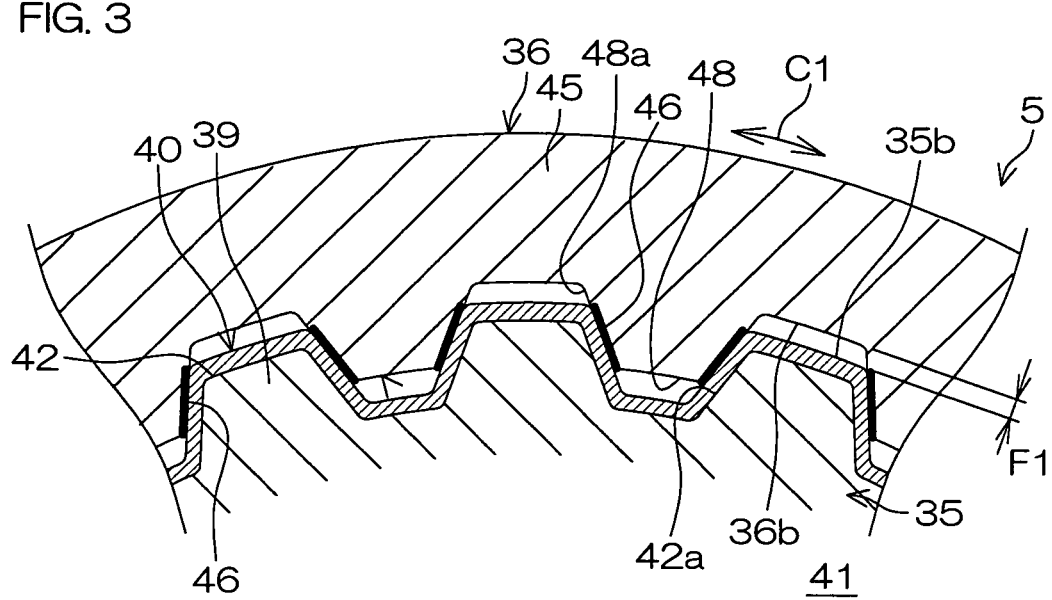
FIG. 3 is a cross-sectional view of a principal part of an intermediate shaft.

Referring to FIGS. 2 and 3, the input shaft 35 includes a core 39, and a first resin coating 40 formed on a surface of a core tooth portion 42 serving as a spline portion on the leading end side of the core 39.

The core 39 in the inner shaft 35 is formed of a metal. A portion, on the leading end side, of the core 39 is a leading end region 41. A plurality of core tooth portions 42 serving as outer tooth portions are formed on the outer periphery of the leading end region 41. The core tooth portions 42 are equally spaced in a circumferential direction of the inner shaft 35. The first resin coating 40 is formed throughout on the outer periphery of the leading end region 41, and covers the whole area of surfaces 42a of the core tooth portions 42. The thickness of the first resin coating 40 is approximately 1 mm, for example.

Referring to FIG. 3, the first resin coating 40 is formed of synthetic resin. Examples of the synthetic resin include thermoplastic resin such as polyamide or polyacetal and thermosetting resin such as epoxy resin. An outer tooth surface 35b of the inner shaft 35 is formed on a surface of the first resin coating 40. The whole of the outer tooth surface 35b of the inner shaft 35 is formed of the first resin coating 40. The outer tooth surface 35b is arranged on the outer periphery of the inner shaft 35.

The outer shaft 36 includes a cylindrical core 45 and a second resin coating 46 formed on a part of an inner surface of the core 45.

The core 45 in the outer shaft 36 is formed of a metal. A plurality of core tooth portions 48 serving as inner tooth portions are formed on the inner periphery of the core 45. The core tooth portions 48 are equally spaced in a circumferential direction of the outer shaft 36. A base end and a leading end of a surface 48a of each of the core tooth portions 48 is exposed, and the second resin coating 46 adheres to a side surface (tooth surface) of the surface 48a.

The second resin coating 46 is provided by processing for sliding an intermediate member for manufacturing the inner shaft 35 and an intermediate member for manufacturing the outer shaft 36 in the axial direction X1, to transfer a part of a resin coating (resin material) provided on the intermediate member for manufacturing the inner shaft 35 for forming the first resin coating 40 to the intermediate member for manufacturing the outer shaft 36.

The second resin coating 46 is formed only in a portion, which abuts on the first resin coating 40, of the outer shaft 36 in a circumferential direction C1 of the inner shaft 35 (hereinafter merely referred to as a circumferential direction C1). The second resin coating 46 is made thinner than the first resin coating 40, and the thickness of the second resin coating 46 is approximately several micrometers, for example.

An exposed portion, which is not covered with the second resin coating 46, of the surface 48a of each of the core tooth portions 48 and a surface of the second resin coating 46 smoothly communicate with each other, and form an inner tooth surface 36b of the outer shaft 36 as a whole (in corporation). Only the second resin coating 46 on the inner tooth surface 36b of the outer shaft 36 substantially abuts on the outer tooth surfaces 35b of the inner shaft 35. An engaging portion between the outer tooth surface 35b and the inner tooth surface 36b in the circumferential direction C1 is a torque transmission surface.

Processes for manufacturing the intermediate shaft 5 will be described with reference to a schematic view of FIG. 4.

In a forging process illustrated in FIG. 4A, an inner shaft manufacturing intermediate member 551 serving as a first (one) manufacturing intermediate member is obtained. The inner shaft manufacturing intermediate member 551 is formed by forging a material (metal material), and has the core tooth portion 42 on its outer periphery.

In a preprocessing process illustrated in FIG. 4B, a surface of the core tooth portion 42 on the inner shaft manufacturing intermediate member 551 illustrated in FIG. 4A is subjected to preprocessing for coating. More specifically, processing in a stage preceding a stage in which a resin layer 56 is formed in a coating process illustrated in FIG. 4C, described below.

The processing in the preceding stage is processing for roughening a surface of the core tooth portion 42 on the inner shaft manufacturing intermediate member 551 in order to improve adhesive properties between the surface of the core tooth portion 42 and the resin layer 56. Examples of this processing include base processing such as shot blasting and primer coating. Thus, an inner shaft manufacturing intermediate member 552 (corresponding to the core 39 in the inner shaft 35) having the core tooth portion 42, which has been subjected to preprocessing, formed on its surface, as illustrated in FIG. 4B, is obtained.

In the coating process illustrated in FIG. 4C, the resin layer 56 is then formed on at least a part (the whole in the present embodiment) of the core tooth portion 42 on the inner shaft manufacturing intermediate member 552 illustrated in FIG. 4B. Thus, an inner shaft manufacturing intermediate member 553 having the resin layer 56 formed on the inner shaft manufacturing intermediate member 553, as illustrated in FIG. 4C, is obtained. More specifically, the inner shaft manufacturing intermediate member 552 that has been subjected to the preprocessing, illustrated in FIG. 4B, is heated. The inner shaft manufacturing intermediate member 552 is then dipped for a predetermined period of time in a tank including resin powder in a fluidized state. Thus, the resin powder is melted by heat after adhering to the inner shaft manufacturing intermediate member 552. As a result, the inner shaft manufacturing intermediate member 553 having the resin layer 56 formed on the inner shaft manufacturing intermediate member 553 is obtained. A cross section on an outer peripheral surface of the resin layer 56 forms a wave shape. The resin layer 56 may be formed by injection-molding.

Then, in a spline forming process illustrated in FIG. 4D, a cylindrical surface broach 500 is prepared. The surface broach 500 is a broach for giving a required shape to an outer surface of a workpiece. A broach for giving a required shape to an inner surface of the workpiece is referred to as an internal broach. The inner shaft manufacturing intermediate member 553 having the resin layer 56 formed thereon is fitted (inserted or pressed) into the surface broach 500. The inner shaft manufacturing intermediate member 553 is reciprocally slid (relatively moved) in its axial direction.

Figure 5:
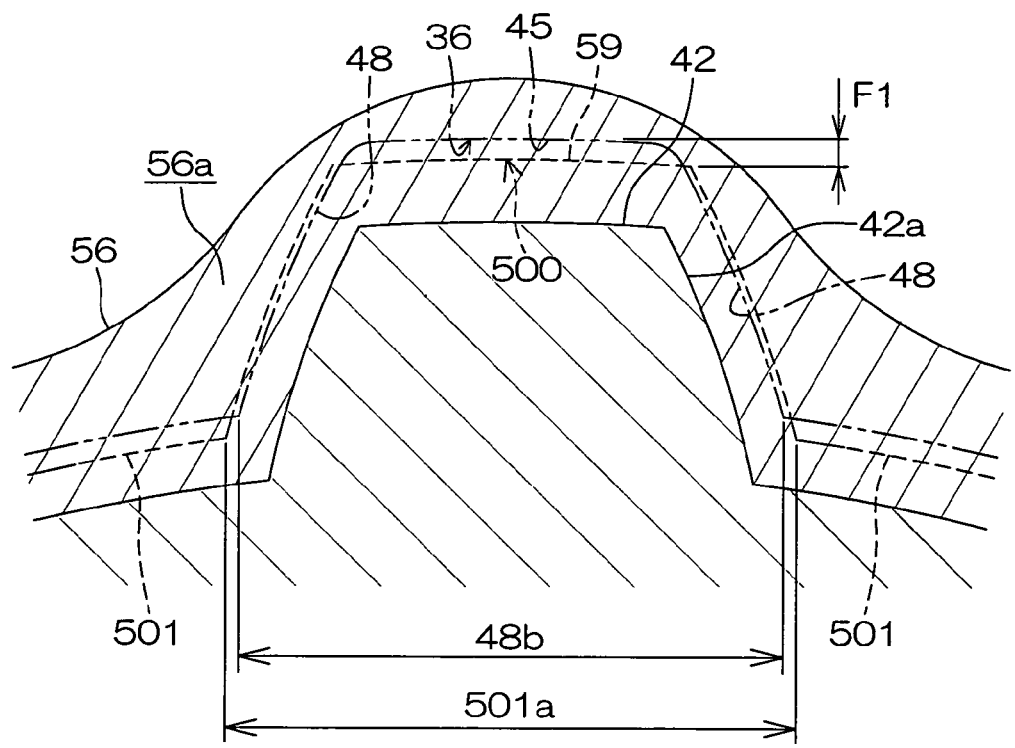
FIG. 5 is a cross-sectional view for explaining formation of spline teeth with a surface broach.

Thus, a resin coating 59 is formed on a surface 42a of the core tooth portion 42 on an inner shaft manufacturing intermediate member 554 (the resin coating 59 is indicated by a broken line), as illustrated in FIG. 5. A surface of the resin coating 59 is formed in a shape along the shape of the surface 42a of the core tooth portion 42 (a shape substantially similar to the shape of the surface 42a of the core tooth portion 42). A plurality of broach teeth 501 are equally spaced in a circumferential direction on an inner peripheral surface of the surface broach 500 (indicated by a broken line in FIG. 5). A cross-sectional shape of the broach teeth 501 is substantially matched with a cross-sectional shape of the core tooth portions 48 in the outer shaft 36 (indicated by an imaginary line in FIG. 5).

A space 501a (the width of a tooth groove) between the broach teeth 501 is wider than a space 48b (the width of a tooth groove) between the core tooth portions 48 (space 501a>space 48b). The distance between a central axis of the surface broach 500 and the bottom of the tooth groove between the broach teeth 501 is shorter than the distance between a central axis of the outer shaft 36 and the bottom of the tooth groove between the core tooth portions 48 by a distance F1.

Therefore, the tooth groove between the broach teeth 501 is wider and shallow than the tooth groove between the core tooth portions 48. By providing the distance F1, the distance between the tooth tip of the inner shaft 35 and the tooth bottom of the outer shaft 36 is substantially the distance F1, as illustrated in FIG. 3.

Referring to FIGS. 4D and 5, in the broaching, the surface broach 500 and the inner shaft manufacturing intermediate member 553 are coaxially arranged, and are fitted to each other and relatively slid in the axial direction, as described above. By the broaching, the broach tooth 501 cuts off an excess portion 56a of the resin layer 56. Thus, the width (equal to the space width 501a) of teeth formed by the broach teeth 501 (corresponding to teeth of the resin coating 40) is larger than the space width 48b between the core tooth portions 48. Therefore, the inner shaft 35 and the outer shaft 36 are fitted to each other with a negative space therebetween in the circumferential direction C1 of the inner shaft 35, as illustrated in FIG. 3. Thus, the inner shaft manufacturing intermediate member 554 is formed.

Then, in a joint connecting process illustrated in FIG. 4E, a universal joint 4 is connected to an end of the inner shaft manufacturing intermediate member 554, to form an inner shaft manufacturing intermediate member 555. In the spline forming process illustrated in FIG. 4D, the universal joint 4 is not attached to the inner shaft manufacturing intermediate member 554. This enables the inner shaft manufacturing intermediate member 554 to be inserted through the surface broach 500 throughout in its axial direction.

Then, a press fitting process is performed, as illustrated in FIG. 4F, before a sliding process illustrated in FIG. 4G. In the press fitting process, the inner shaft manufacturing intermediate member 555 and an outer shaft manufacturing intermediate member 57 serving as a second manufacturing intermediate member are fitted to each other with a negative fitting space therebetween. The outer shaft manufacturing intermediate member 57 has a similar configuration to that of the outer shaft 36 except that the second resin coating 46 is not formed. A pressing load at this time is approximately 2 kN to 5 kN, for example. As illustrated in FIG. 5, the tooth thickness of the inner shaft manufacturing intermediate member 555 used in the press fitting process (the space width 501a, i.e., the thickness in a free state of the inner shaft manufacturing intermediate member 555) is larger than the space width of the outer shaft manufacturing intermediate member 57 (the space width 48b between the core tooth portions 48).

In the sliding process illustrated in FIG. 4G, the inner shaft manufacturing intermediate member 555 that has pressed into the outer shaft manufacturing intermediate member 57 is forcibly slid in the axial direction X1 relative to the outer shaft manufacturing intermediate member 57. At this time, a torsional torque E1 is exerted between the inner shaft manufacturing intermediate member 555 and the outer shaft manufacturing intermediate member 57. More specifically, the outer shaft manufacturing intermediate member 57 is fixed by a jig 65 while the inner shaft manufacturing intermediate member 555 is fixed to an arm 66, for example. The inner shaft manufacturing intermediate member 555 is slid in the axial direction X1 relative to the outer shaft manufacturing intermediate member 57 in the axial direction X1 while being twisted with respect to the outer shaft manufacturing intermediate member 57 by the arm 66. The torsional torque E1 need not be exerted between the inner shaft manufacturing intermediate member 555 and the outer shaft manufacturing intermediate member 57.

The sliding between the inner shaft manufacturing intermediate member 555 and the outer shaft manufacturing intermediate member 57 causes the core tooth portion 48 in the outer shaft manufacturing intermediate member 57 and the resin coating 59 on the inner shaft manufacturing intermediate member 555 to come into frictional contact, to generate frictional heat. As a result, apart of a resin material composing the resin coating 59 is softened and transferred to the surface 48a of the core tooth portion 48, to adhere to the surface 48a. Thus, the resin coating 59 forms a first resin coating 40, to complete the inner shaft 35.

The second resin coating 46 is formed on the core tooth portion 48 in the outer shaft manufacturing intermediate member 57, to complete the outer shaft 36. The sliding between the inner shaft manufacturing intermediate member 555 and the outer shaft manufacturing intermediate member 57 is stopped when a measured value of a sliding load between the inner shaft manufacturing intermediate member 555 and the outer shaft manufacturing intermediate member 57 is a predetermined threshold value or less.

In the sliding process, the inner shaft manufacturing intermediate member 555 and the outer shaft manufacturing intermediate member 57 may be heated to a temperature that is less than a melting temperature (a temperature close to a melting point) of the resin material composing the resin coating 59 by an external heater.

In a grease coating process illustrated in FIG. 4H, a surface of the first resin coating 40 in the inner shaft 35 is coated with grease 68. The inner shaft 35 that has been coated with the grease 68 is assembled into an outer shaft 36, to complete an intermediate shaft 5 serving as a spline telescopic shaft, as illustrated in FIG. 4I.

As described above, according to the present embodiment, the first resin coating 40 in the inner shaft 35 and the second resin coating 46 in the outer shaft 36 are brought into contact with each other. This enables contact between the inner shaft 35 and the outer shaft 36 to be contact between resins having low frictional resistances. A part of the resin coating 59 provided to form the first resin coating 40 is transferred to the outer shaft manufacturing intermediate member 57 by the sliding between the inner shaft manufacturing intermediate member 555 and the outer shaft manufacturing intermediate member 57. Thus, a second resin coating 46 is formed when the intermediate shaft 5 is manufactured. As a result of thus forming the second resin coating 46, respective surface roughnesses of the first resin coating 40 and the second resin coating 46 are significantly reduced. Moreover, backlash (a space) between the first and second resin coatings 40 and 46 can be significantly reduced in the circumferential direction C1 of both the shafts 35 and 35. Thus, the first and second resin coatings 40 and 46 can be inhibited from rapidly wearing in the early stages of use of the intermediate shaft 5. Further, the wear of the first and second resin coatings 40 and 46 can be suppressed over a long period of time. As a result of thus suppressing the backlash between the first and second resin coatings 40 and 46, a rattle sound (a collision sound between both the tooth surfaces 35b and 36b generated in a space in the circumferential direction between the inner shaft 35 and the outer shaft 36) can be suppressed. This can improve quietness. As a result of suppressing the backlash between the first and second resin coatings 40 and 46, a steering' feeling can be improved.

In other words, both the manufacturing intermediate members 555 and 57 are slid in the sliding process, so that a part of the resin coating 59 on the inner shaft manufacturing intermediate member 555 is transferred to the outer shaft manufacturing intermediate member 57. As a result, the second resin coating 46 is formed on the outer shaft manufacturing intermediate member 57. As a result of thus forming the second resin coating 46 on the outer shaft manufacturing intermediate member 57, the backlash between the first and second resin coatings 40 and 46 can be significantly reduced in the circumferential direction C1 while significantly reducing the surface roughnesses of the first and second resin coatings 40 and 46. Thus, the intermediate shaft 5 using both the shafts 35 and 36 can inhibit the first and second resin coatings 40 and 46 from rapidly wearing in the early stages of use. Moreover, in the intermediate shaft 5, the wear of the first and second resin coatings 40 and 46 can be suppressed over a long period of time. As a result of thus suppressing the backlash between the first and second resin coatings 40 and 46, a rattle sound can be suppressed. This can more greatly improve quietness. As a result of suppressing the backlash between the first and second resin coatings 40 and 46, a steering feeling can be improved.

Thus, a highly accurate fitted state between the inner shaft 35 and the outer shaft 36 can be realized so that the backlash between the inner shaft 35 and the outer shaft 36 can be prevented for a long time. A sliding load between both the shafts 35 and 36 can be reduced so that a sliding load in assembling the intermediate shaft 5 into a vehicle can be reduced and the durability of the intermediate shaft 5 can be enhanced. A change in the sliding load between both the shafts 35 and 36 can be reduced. Thus, so-called stick lip between the inner shaft 35 and the outer shaft 36 is prevented so that good quietness can be obtained over a long period of time. Noise generated by the rattle sound between the tooth surfaces 35b and 36b can be reduced.

The first resin coating 40 forms the outer tooth surface 35b. This enables the outer tooth surface 35 to be a surface having a low frictional resistance.

Furthermore, the second resin coating 46 forms the inner tooth surface 36b in corporation with the surface 48a of the core tooth portion 48 in the outer shaft 36. Thus, the inner tooth surface 36b can be formed of a small amount of resin material.

The thickness of the second resin coating 46 is smaller than the thickness of the first resin coating 40. Thus, the inner tooth surface 36b can be formed of a small amount of resin material.

Furthermore, in the sliding process, the torsional torque E1 is applied to the inner shaft manufacturing intermediate member 555 and the outer shaft manufacturing intermediate member 57. Thus, the inner shaft manufacturing intermediate member 555 and the outer shaft manufacturing intermediate member 57 can be reliably pressure-welded to each other in the circumferential direction C1. Thus, a part of the resin coating 59 on the inner shaft manufacturing intermediate member 555 can be reliably transferred to the outer shaft manufacturing intermediate member 57.

In the sliding process, frictional heat is applied to the resin coating 59 on the inner shaft manufacturing intermediate member 555 by the sliding between the inner shaft manufacturing intermediate member 555 and the outer shaft manufacturing intermediate member 57. This enables the resin coating 59 to be softened. Thus, a part of the resin coating 59 can be more reliably transferred to the outer shaft manufacturing intermediate member 57.

Furthermore, the sliding process is completed by setting a load in sliding the inner shaft manufacturing intermediate member 555 and the outer shaft manufacturing intermediate member 57 in the axial direction to a predetermined threshold value or less. Thus, timing at which the sliding process is completed can be easily determined using the load in sliding both the manufacturing intermediate members 555 and 57.

Before the sliding process, the inner shaft manufacturing intermediate member 555 and the outer shaft manufacturing intermediate member 57 are fitted to each other with a negative fitting space therebetween. More specifically, the tooth thickness (the length 501a) of the inner shaft manufacturing intermediate member 555 is made larger than the groove width of the outer shaft manufacturing intermediate member 57, to press the inner shaft manufacturing intermediate member 555 into the outer shaft manufacturing intermediate member 57.

This enables the inner shaft manufacturing intermediate member 555 and the outer shaft manufacturing intermediate member 57 to be reliably pressure-welded to each other, thereby enabling the resin coating 59 on the inner shaft manufacturing intermediate member 555 to be reliably transferred to the outer shaft manufacturing intermediate member 57. Therefore, the second resin coating 46 can be reliably formed on the outer shaft manufacturing intermediate member 57. The first resin coating 40 on the inner shaft manufacturing intermediate member 555 and the second resin coating 46 on the outer shaft manufacturing intermediate member 57 can be reliably fitted to each other. This enables a contact area between the first and second resin coatings 40 and 46 to be reliably increased at a microscopic level (a surface roughness level, i.e., a level of the size of irregularities of a striped processing trace in an axial direction produced on the tooth surfaces 35b and 36b when spline processing is performed). As a result, local abrasion can be reliably inhibited from occurring between the inner shaft 35 and the outer shaft 36 due to the sliding between both the shafts 35 and 36.

The resin coating 59 on the inner shaft manufacturing intermediate member 554 is formed in a spline shape using the surface broach 500. As a result, the resin coating 59 on the inner shaft manufacturing intermediate member 554 and the core tooth portion 48 in the outer shaft manufacturing intermediate member 57 can be fitted to each other with a negative space therebetween in a circumferential direction (torque transmission surfaces contact each other with a negative space therebetween), and a space can be formed between the tooth tip of the resin coating 59 and the tooth bottom of the outer shaft manufacturing intermediate member 57. In the press fitting process for pressing the inner shaft manufacturing intermediate member 555 having the resin coating 59 formed thereon into the outer shaft manufacturing intermediate member 57, therefore, the manufacturing intermediate members 555 and 57 contact each other only on their respective torque transmission surfaces. Thus, the tooth tip of the inner shaft manufacturing intermediate member 555 and the tooth bottom of the outer shaft manufacturing intermediate member 57 enter a noncontact state. Therefore, a load required for the press fitting between both the manufacturing intermediate members 555 and 57 may be small so that work for the press fitting can be easily performed.

In the sliding process (fitting process), a sliding load between the inner shaft manufacturing intermediate member 555 and the outer shaft manufacturing intermediate member 57 can also be reduced. This enables the sliding process to be performed with a relatively low facility capacity.

If a facility for performing the sliding process has a sufficient capacity, the tooth tip of the inner shaft manufacturing intermediate member 555 and the tooth bottom of the outer shaft manufacturing intermediate member 57 may be fitted to each other with a negative space therebetween (in a pressure-welded state).

A surface of the resin coating 59 on the first manufacturing intermediate member 554 is formed to a shape along a surface shape of the core tooth portion 42 in the first manufacturing intermediate member 555 (a substantially similar shape) by broaching in the spline forming process. Thus, the surface shape of the resin coating 59 on the first manufacturing intermediate member 555 can be formed with high accuracy. Therefore, a contact portion between the first manufacturing intermediate member 555 and the second manufacturing intermediate member 57 can be set with high accuracy in the sliding process. Thus, a part of the resin coating 59 can be transferred to a desired portion of the second manufacturing intermediate member 57.

As described above, backlash can be prevented from being produced in the intermediate shaft 5 in the early stages of use of the vehicle steering apparatus 1, and the production of backlash can be suppressed over a long period of time. As a result, a good steering feeling can be maintained over a long period of time, and high quietness can be realized by suppressing a rattle sound over a long period of time.

The intermediate shaft 5 constitutes a part of a power transmission path for transmitting an output of the electric motor 24 to the steering mechanism A1. The intermediate shaft 5 receives a great torque (steering assist force) of the electric motor 24. However, backlash is prevented from being produced in the intermediate shaft 5 from the early stages of use of the vehicle steering apparatus 1. Even if the great torque is repeatedly exerted on the intermediate shaft 5, therefore, the production of backlash between the inner shaft 35 and the outer shaft 36 can be reliably suppressed over a long period of time.

As to generation of frictional heat for heating the inner shaft manufacturing intermediate member 555 in the sliding process illustrated in FIG. 4G, as sliding conditions between the inner shaft manufacturing intermediate shaft 555 and the outer shaft manufacturing intermediate member 57, a sliding stroke between the inner shaft manufacturing intermediate member 555 and the outer shaft manufacturing intermediate member 57 is in a range of ±10 mm to ±50 mm (20 mm to 100 mm), and a sliding frequency is 1.5 Hz to 10 Hz.

The range of the stroke enables the inner shaft manufacturing intermediate member 555 and the outer shaft manufacturing intermediate member 57 to be slid at a sufficient stroke without coming off each other. Therefore, sufficient frictional heat can be applied to the resin coating 59.

The sliding frequency enables suitable frictional heat to be applied to the resin coating 59.

The necessity of external heating means is eliminated by using frictional heat so that a manufacturing facility can be simplified.

When the heat fitting processing is performed using frictional heat, the inner shaft manufacturing intermediate member 555 and the outer shaft manufacturing intermediate member 57 can be slid at a long sliding stroke (±30 mm or more) and at high speed (2 Hz or more) to perform the heat fitting process at high efficiency. This is for the following reasons. More specifically, a large amount of heat generation can be obtained, and the temperature of the outer shaft 36 can be suppressed, therefore, molten resin can be transferred to the outer shaft 36 in a shorter time. Thus, the thickness of a softened layer of the manufacturing intermediate member 57 is reduced, generation of roller-shaped abrasion powder can be suppressed, and a tooth surface can stably be formed.

The present invention is not limited to the contents of the above-mentioned embodiment, so, various changes can be made within the scope of claims.

Figure 6:
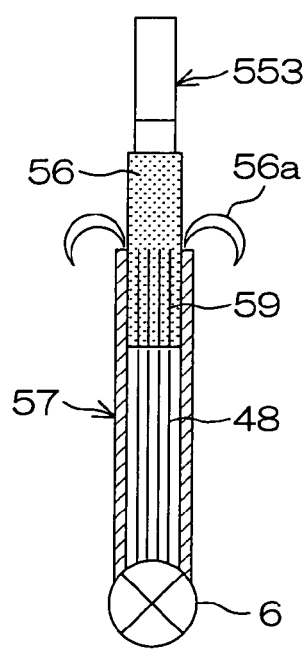
FIG. 6 is a cross-sectional view of a spline forming process according to another embodiment of the present invention.

For example, in the spline forming process illustrated in FIG. 4D, the surface broach 500 may be replaced with an outer shaft manufacturing intermediate member 57 illustrated in FIG. 6. The outer shaft manufacturing intermediate member 57 has a similar configuration to that of the outer shaft 36 except that the second resin coating 46 is not formed. In this case, an inner shaft manufacturing intermediate member 553 having a resin layer 56 formed thereon is fitted to the outer shaft manufacturing intermediate member 57, and is slid in an axial direction X1. Thus, a resin coating 59 in an external spline shape is formed on the inner shaft manufacturing intermediate member 553.

The inner shaft manufacturing intermediate member 555 and the outer shaft manufacturing intermediate member 57 may be slid in the axial direction X1 while being loose-fitted to each other, to form the second resin coating 46.

Figure 7:
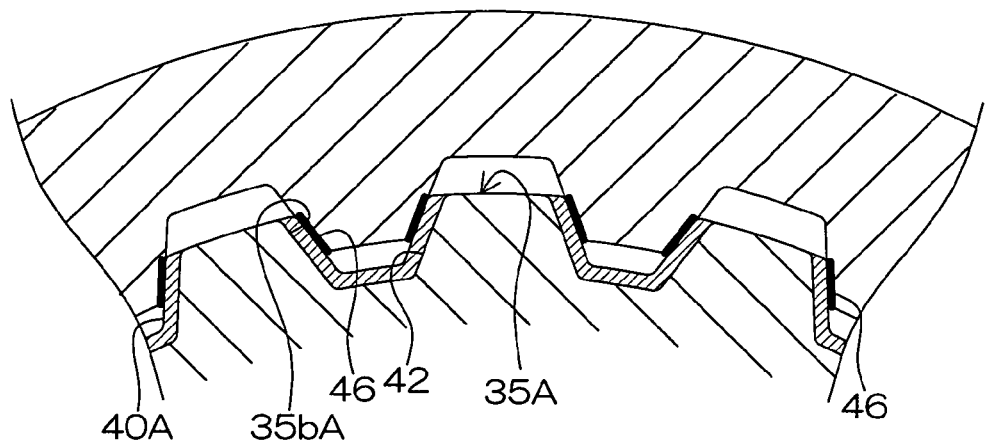
FIG. 7 is a cross-sectional view of a principal part in another embodiment of the present invention.
Figure 8:
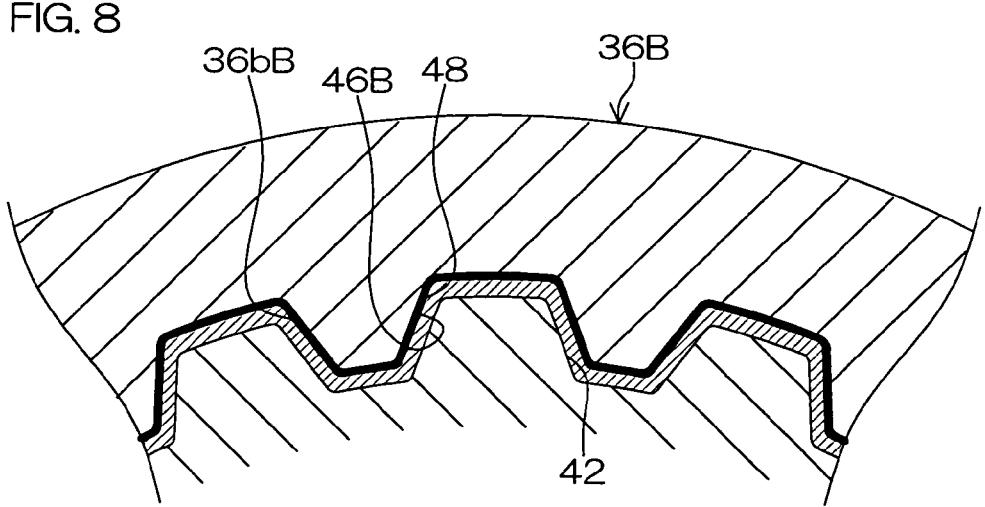
FIG. 8 is a cross-sectional view of a principal part in still another embodiment of the present invention.

Furthermore, a part of a core tooth portion 42 in an inner shaft 35A need not be covered with a first resin coating 40A, as illustrated in FIG. 7. At this time, an outer tooth surface 35bA of the inner shaft 35A is formed by cooperation between the core tooth portion 42 and the first resin coating 40A. Alternatively, the whole of a core tooth portion 48 in an outer shaft 36B may be covered with a second resin coating 46B, as illustrated in FIG. 8. At this time, the second resin coating 46B forms an inner tooth surface 36bB of the outer shaft 36B.

A resin coating 59C may be formed on the whole of a surface 48a of a core tooth portion 48 in an outer shaft manufacturing intermediate member 57C, and may be transferred to an inner shaft manufacturing intermediate member 555C by sliding in an axial direction between the inner shaft manufacturing intermediate member 555C and the outer shaft manufacturing intermediate member 57C. In this case, the outer shaft manufacturing intermediate member 57C is a first manufacturing intermediate member, and the inner shaft manufacturing intermediate member 555C is a second manufacturing intermediate member.

In this case, the resin coating 59C can be formed by cutting off a resin coating on the outer shaft manufacturing intermediate member 57C by the inner shaft manufacturing intermediate member 555C actually used or performing broaching with a stick-shaped internal broach having a similar shape to that of a core tooth portion 42 in an inner shaft 35C, to cut off the resin coating on the outer shaft manufacturing intermediate member 57C. When the stick-shaped internal broach is used, the broaching is performed so that teeth of the outer shaft manufacturing intermediate member 57C and teeth of the inner shaft manufacturing intermediate member 555C can be opposed to each other with a negative space therebetween (in a pressure-welded state) in a circumferential direction and with a space therebetween in a radial direction.

The outer shaft manufacturing intermediate member 57C and the inner shaft manufacturing intermediate member 555C are slid in an axial direction so that a part of the resin coating 59C on the outer shaft manufacturing intermediate member 57C is transferred to a surface 42a of the core tooth portion 42 on the inner shaft manufacturing intermediate member 555C.

Figure 9:
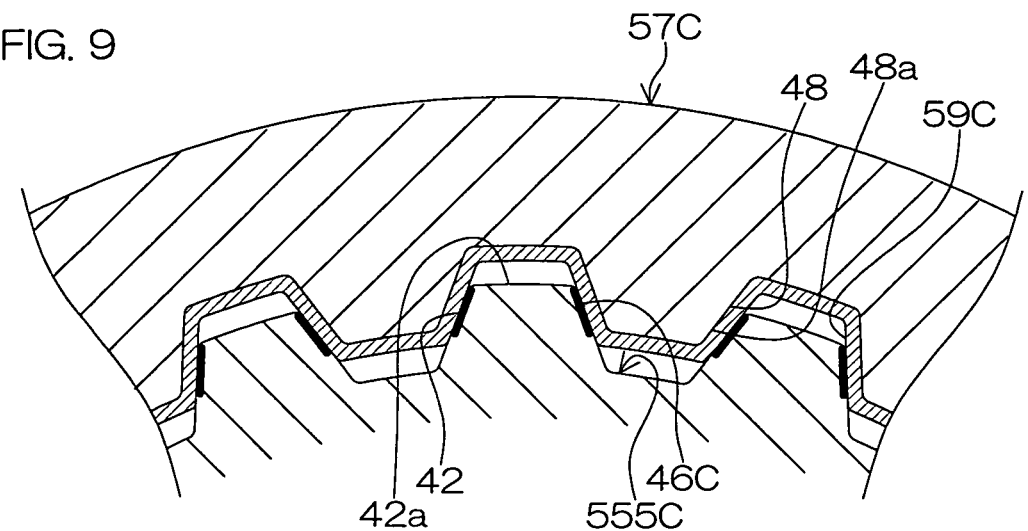
FIG. 9 is a cross-sectional view of a principal part for explaining manufacture of an intermediate shaft according to a further embodiment of the present invention.
Figure 10:
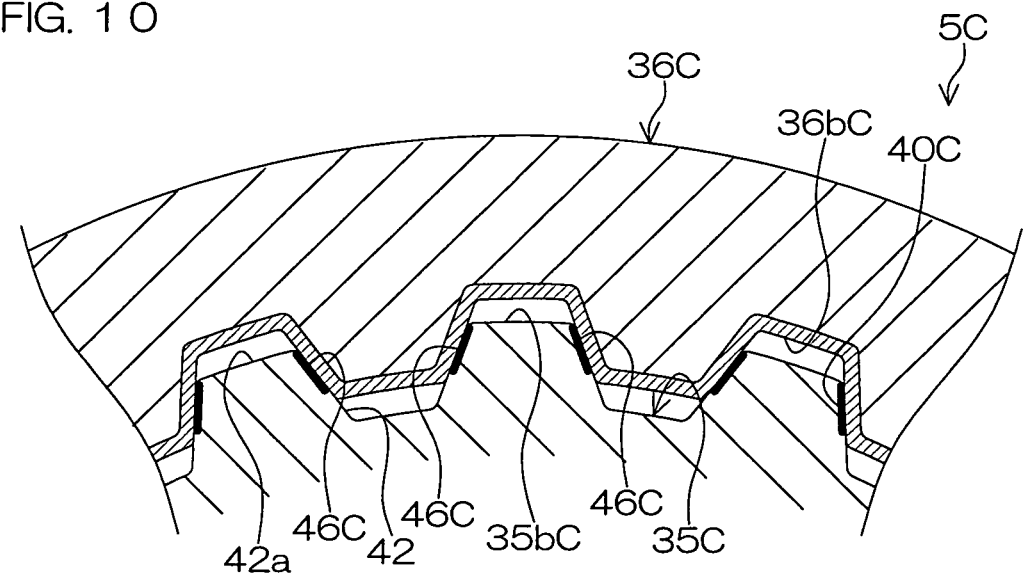
FIG. 10 is a cross-sectional view of a principal part of an intermediate shaft formed by manufacturing processes illustrated in FIG. 9.

Referring to FIGS. 9 and 10, the resin coating 59C thus forms the first resin coating 40C. A part of the resin coating 59C is transferred to the inner shaft manufacturing intermediate member 555C so that a second resin coating 46C is formed. The outer shaft manufacturing intermediate member 57C thus forms an outer shaft 36C. The inner shaft 35C and the outer shaft 36C are fitted to each other, as illustrated in FIG. 10, to form a spline telescopic shaft 5C including the inner shaft 35C and the outer shaft 36C.

An outer tooth surface 35bC of the inner shaft 35C is formed by cooperation between the surface 42a of the core tooth portion 42 and the second resin coating 46C. An inner tooth surface 36bC of the outer shaft 36C is formed by the first resin coating 40C.

In the present embodiment, the vehicle steering apparatus 1 is a so-called column assist type electric power steering apparatus for applying a steering assist force to the steering shaft 3. However, a vehicle steering apparatus to which the spline telescopic shaft according to the present invention is applied may be a so-called pinion assist type electric power steering apparatus for applying a steering assist force to the pinion shaft 7. The vehicle steering apparatus may be a so-called rack assist type electric power steering apparatus for applying a steering assist force to the rack shaft 8. The present invention may be applied to a steering apparatus for a manual steering vehicle. The present invention is also usable as a telescopic shaft for telescopically adjusting a steering column.

EXAMPLES

The present invention will be described below based on an example and a comparative example.

Example 1 and Comparative Example 1

A spline telescopic shaft in an example 1 in which an inner shaft 35 and an outer shaft 36 are fitted to each other was produced.

A spline telescopic shaft in a comparative example 1 was prepared via similar processes to those in the example 1 except that the sliding process illustrated in FIG. 4 was omitted. That is, the spline telescopic shaft in the comparative example 1 has a similar configuration to that of the spline telescopic shaft in the example 1 except that a second resin coating 46 was not formed.

Loading Test 1

As to each of the spline telescopic shafts in the example 1 and the comparative example 1, a load required to start to relatively slide an inner shaft and an outer shaft in an axial direction was measured as a starting load. A load required to continue to relatively slide the inner shaft and the outer shaft in the axial direction was measured as a sliding load.

As to each of the spline telescopic shafts in the example 1 and the comparative example 1, a difference between the starting load and the sliding load was divided by the sliding load. That is, (starting load—sliding load)/sliding load was found.

Figure 11A:
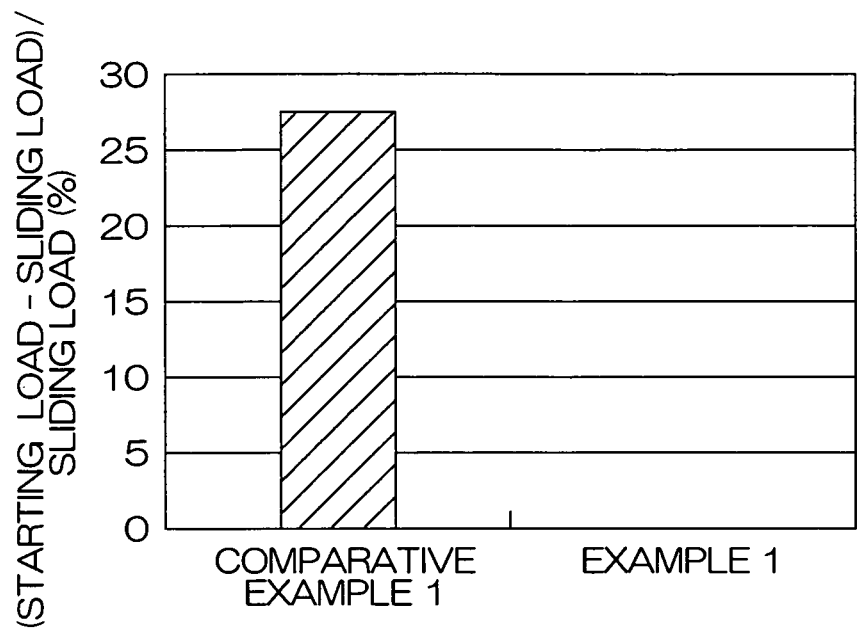
FIG. 11A is a graph illustrating results of a loading test 1.

The results were illustrated in FIG. 11A.

When the result was expressed by percentage, it was approximately 28% in the comparative example 1. This proved that a starting load that was approximately 28% greater than a sliding load was required.

On the other hand, the result was substantially zero % in the example 1. This proved that sliding between the inner shaft and the outer shaft could be started with a substantially similar starting load to the sliding load.

As described above, in the spline telescopic shaft in the example 1, the inner shaft and the outer shaft could be significantly smoothly slid in an axial direction because the load hardly changed depending on whether the sliding was started or was being performed. As a result, a stick slip phenomenon could be reliably suppressed, which proved that quietness could be improved. The sliding load was reliably suppressed, which also proved that the spline telescopic shaft in the example 1 was superior in endurance. Further, the sliding load at the time of assembling into a vehicle could be reduced, which proved that assembling work could also be easily performed. That is, it is proved that both the inner shaft and the outer shaft were easily fitted to each other when assembled.

Loading Test 2

As to each of the spline telescopic shafts in the example 1 and the comparative example 1, a torque of 30 Nm was loaded between the inner shaft and the outer shaft. The sliding load at this time per 1 Nm was calculated.

Figure 11B:
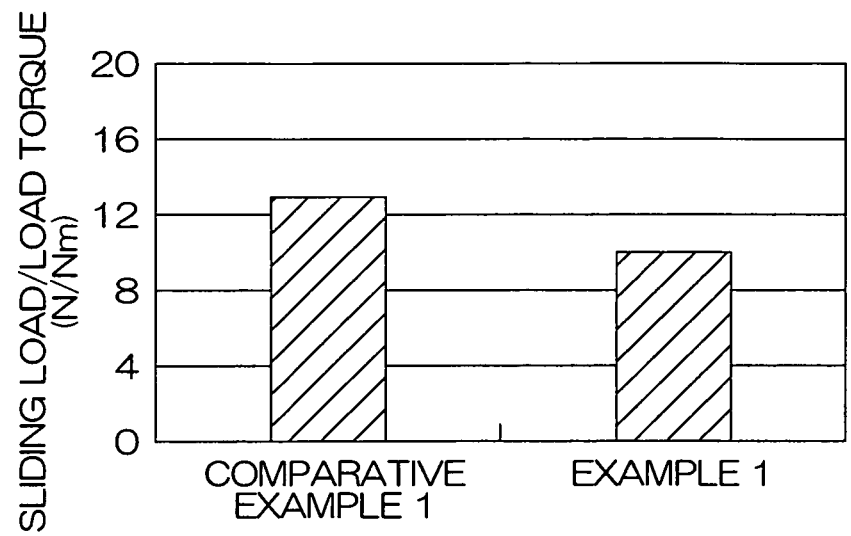
FIG. 11B is a graph illustrating results of a loading test 2.

The results were illustrated in FIG. 11B.

As illustrated in FIG. 11B, the result was approximately 13 N in the comparative example 1. On the other hand, the result was approximately 10 N in the example 1. That is, the result in the example 1 was approximately 23% smaller than that in the comparative examples 1.

As described above, in the spline telescopic shaft in the example 1, a change in the sliding load was significantly smaller than a change in a torque exerted between the inner shaft and the outer shaft. In the spline telescopic shaft in the example 1, the inner shaft and the outer shaft could be thus significantly smoothly slid. As a result, the stick slip phenomenon could be reliably suppressed. This proved that quietness could be improved. The sliding load was reliably suppressed so that a sliding load at the time of assembling into a vehicle could also be reduced. This proved that the spline telescopic shaft in the example 1 could easily be assembled into the vehicle, and was superior in durability.

While preferred embodiments of the present invention have been described above, it is to be understood that variations and modifications will be apparent to those skilled in the art without departing the scope and spirit of the present invention. The scope of the present invention, therefore, is to be determined solely by the following claims and equivalents of the following claims.

This application corresponds to Japanese Patent Application No. 2009-184542 filed with the Japanese Patent Office on Aug. 7, 2009, the disclosure of which is hereinto incorporated by reference in its entirety.

What is claimed is:

1. A spline telescopic shaft, comprising:
   an inner shaft having an outer tooth surface formed on its outer periphery;
   a cylindrical outer shaft having an inner tooth surface arranged to engage with the outer tooth surface and arranged to fit to the inner shaft slidably in an axial direction of the inner shaft;
   a first resin coating that is provided on either one of the outer tooth surface and the inner tooth surface; and
   a second resin coating that is made with the same resin material of the first resin coating provided on the other of the outer tooth surface and the inner tooth surface,
   wherein a thickness of the first resin coating is larger than a thickness of the second resin coating, and
   wherein the second resin coating is provided by processing for fitting and repeatedly sliding an unfinished inner shaft and an unfinished outer shaft in the axial direction with sliding force for generating frictional heat, without other heat power, to transfer a portion of a resin material that is melted only by the frictional heat provided on the outer tooth surface or the inner tooth surface of the unfinished inner shaft or the unfinished outer shaft to the inner tooth surface or the outer tooth surface of the unfinished outer shaft or the unfinished inner shaft by the frictional heat only.

2. The spline telescopic shaft according to claim 1, wherein the inner shaft includes a core having a core tooth portion formed on its outer periphery,
   the first resin coating is provided on the core tooth portion of the inner shaft, and
   the first resin coating forms at least a part of the outer tooth surface.

3. The spline telescopic shaft according to claim 2, wherein the outer shaft includes a core having a core tooth portion formed on its inner periphery, the second resin coating is provided on the core tooth portion of the outer shaft, and the second resin coating forms at least a part of the inner tooth surface.

4. The spline telescopic shaft according to claim 3, wherein the second resin coating is provided on a part of a surface of the core tooth portion in the outer shaft, and the second resin coating forms the inner tooth surface in cooperation with the surface of the core tooth portion in the outer shaft.

5. A method for manufacturing a spline telescopic shaft, the method comprising the steps of:

preparing a first manufacturing intermediate member that is an unfinished inner shaft or an unfinished outer shaft for manufacturing an inner shaft having a core tooth portion formed on its outer periphery or for manufacturing a cylindrical outer shaft having a core tooth portion formed on its inner periphery;

preparing a second manufacturing intermediate member that is the unfinished outer shaft or the unfinished inner shaft for manufacturing the cylindrical outer shaft having the core tooth portion on its inner periphery or for manufacturing the inner shaft having the core tooth portion formed on its outer periphery;

providing a resin coating on the surface of the core tooth portion of the unfinished inner shaft or the unfinished outer shaft of the first manufacturing intermediate member;

fitting the first manufacturing intermediate member and the second manufacturing intermediate member by press fitting; and repeatedly sliding the first manufacturing intermediate member and the second manufacturing intermediate member, which are press coupled with each other by being forcibly slid in an axial direction of the first and the second manufacturing intermediate members, wherein in the sliding step, a portion of the resin coating that is melted only by the frictional heat without other heat power is transferred to the surface of the core tooth portion in the second manufacturing intermediate member, to provide a resin coating on the surface of the core tooth portion in the second manufacturing intermediate member by the frictional heat only.

6. The method for manufacturing the spline telescopic shaft according to claim 5, wherein in the sliding step, a torsional torque is applied to the first and second manufacturing intermediate members.

7. The method for manufacturing the spline telescopic shaft according to claim 5, wherein in the sliding step, a sliding stroke between the first manufacturing intermediate member and the second manufacturing intermediate member is set to 20 mm to 100 mm.

8. The method for manufacturing the spline telescopic shaft according to claim 5, wherein in the sliding step, a sliding frequency between the first manufacturing intermediate member and the second manufacturing intermediate member is set to 1.5 Hz to 10 Hz.

9. The method for manufacturing the spline telescopic shaft according to claim 5, wherein the sliding step is completed when a load from sliding the first manufacturing intermediate member and the second manufacturing intermediate member in the axial direction is less than or equal to a predetermined threshold value.

10. The method for manufacturing the spline telescopic shaft according to claim 5, wherein in the fitting step, the first manufacturing intermediate member and the second manufacturing intermediate member are fitted to each other with a negative fitting space between the first manufacturing intermediate member and the second manufacturing intermediate member.

11. The method for manufacturing the spline telescopic shaft according to claim 10, wherein in the fitting step, the first manufacturing intermediate member with the tooth thickness of the first manufacturing intermediate member that is larger than the groove width of the second manufacturing intermediate member is pressed into the second manufacturing intermediate member.

12. The method for manufacturing the spline telescopic shaft according to claim 5, wherein in the preparing step, a surface of the resin coating on the first manufacturing intermediate member is formed to a shape along a surface shape of the core tooth portion in the first manufacturing intermediate member by broaching.

13. A vehicle steering apparatus having a telescopic shaft for vehicle steering including a spline telescopic shaft, wherein a steering force is transmitted using the spline telescopic shaft, the spline telescopic shaft comprising:

an inner shaft having an outer tooth surface formed on its outer periphery;

a cylindrical outer shaft having an inner tooth surface arranged to engage with the outer tooth surface and arranged to fit to the inner shaft slidably in an axial direction of the inner shaft;

a first resin coating that is provided on either one of the outer tooth surface and the inner tooth surface; and a second resin coating that is made with the same resin material of the first resin coating provided on the other of the outer tooth surface and the inner tooth surface, wherein a thickness of the first resin coating is larger than a thickness of the second resin coating, and wherein the second resin coating is provided by processing for fitting and repeatedly sliding an unfinished inner shaft and an unfinished outer shaft in the axial direction with sliding force for generating frictional heat, without other heat power, to transfer a portion of a resin material that is melted only by the frictional heat provided on the outer tooth surface or the inner tooth surface of the unfinished inner shaft or the unfinished outer shaft to the inner tooth surface or the outer tooth surface of the unfinished outer shaft or the unfinished inner shaft by the frictional heat only.

14. The vehicle steering apparatus according to claim 13, further comprising a steering mechanism configured to steer a wheel, and an electric motor configured to apply a steering assist force to the steering mechanism, wherein the spline telescopic shaft constitutes a part of a power transmission path for transmitting an output of the electric motor to the steering mechanism.

* * * * *